Oct. 1, 1963   R. F. HEWITT   3,105,340
COTTON RECOVERING MACHINE

Filed July 13, 1962   4 Sheets-Sheet 1

INVENTOR.
ROY F. HEWITT,
BY
McMorrow, Berman + Davidson
ATTORNEYS.

Oct. 1, 1963   R. F. HEWITT   3,105,340
COTTON RECOVERING MACHINE
Filed July 13, 1962   4 Sheets-Sheet 2

INVENTOR.
ROY F. HEWITT,
BY
McMorrow, Berman & Davidson
ATTORNEYS.

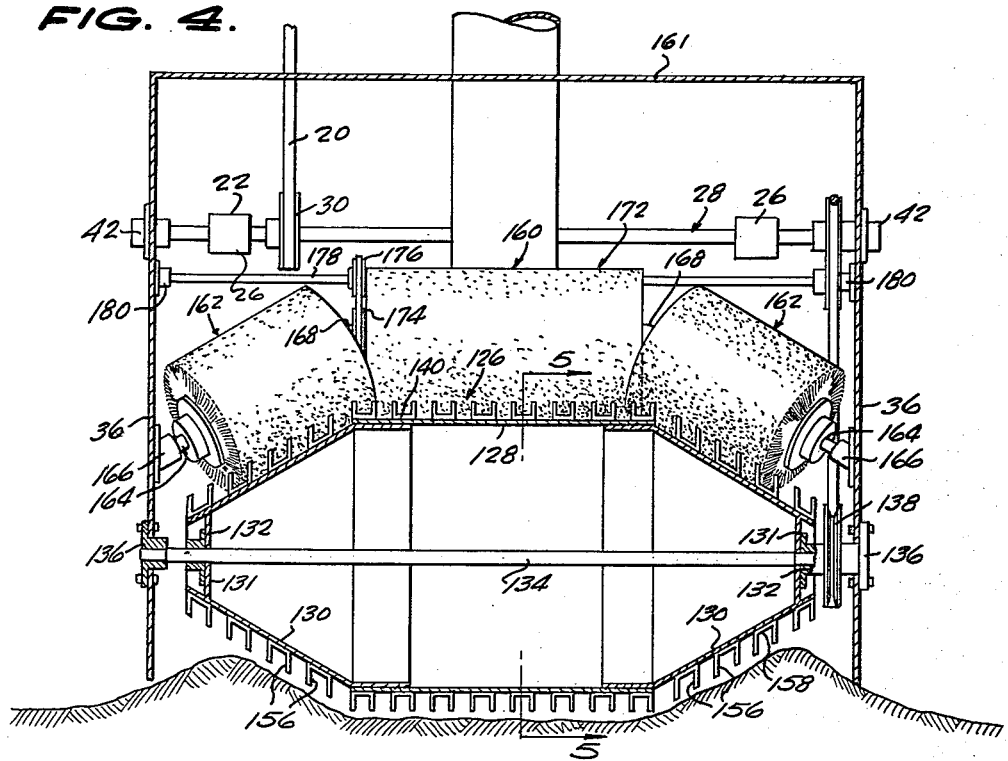
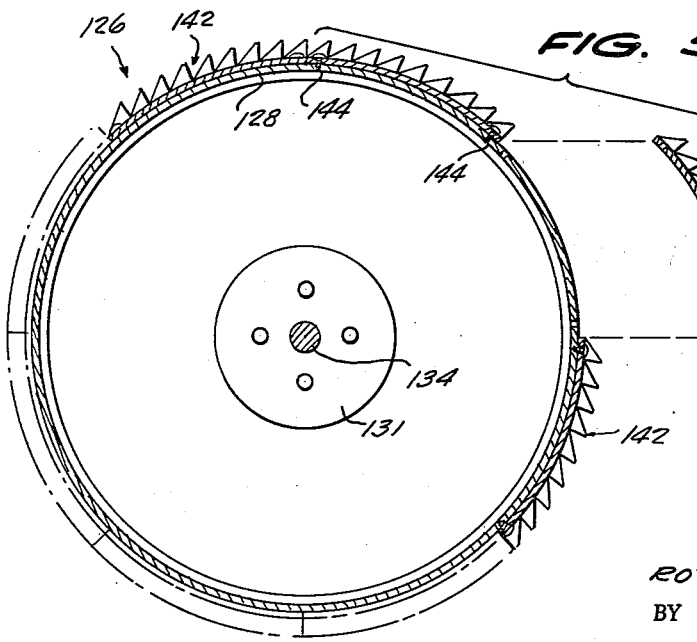
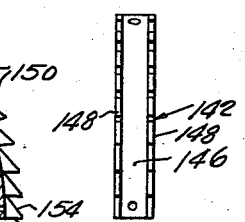

Oct. 1, 1963 R. F. HEWITT 3,105,340
COTTON RECOVERING MACHINE
Filed July 13, 1962 4 Sheets-Sheet 4
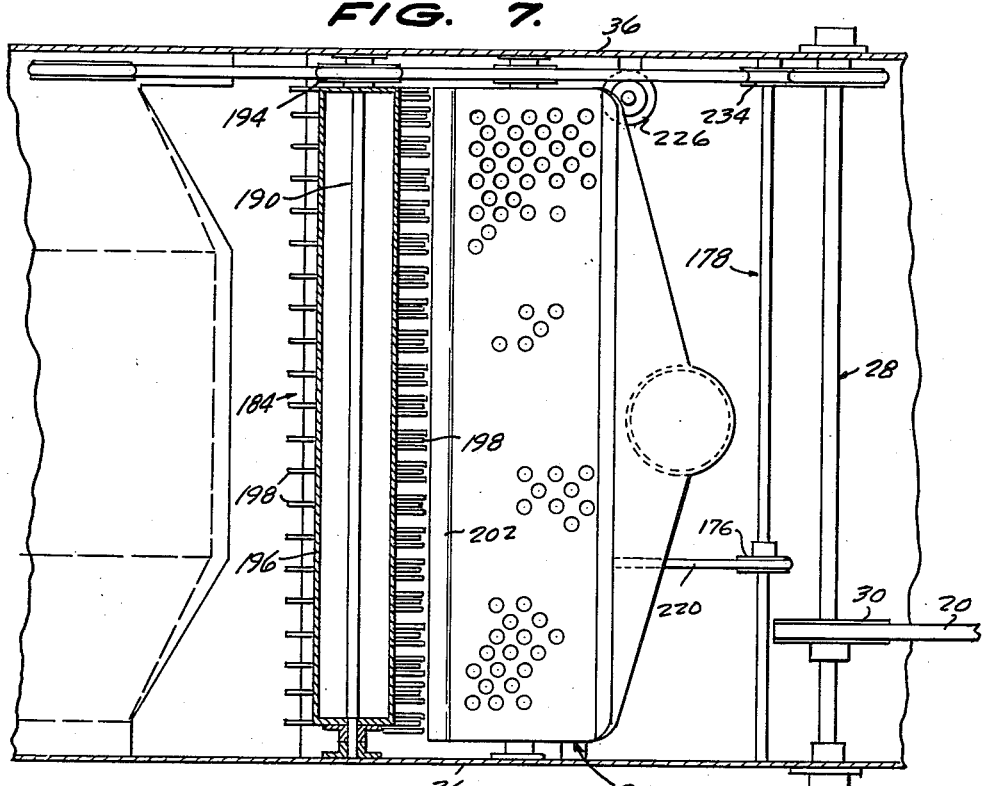
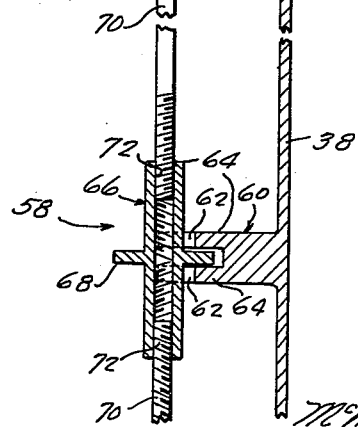
INVENTOR.
ROY F. HEWITT,
BY
McMorrow, Berman & Davidson
ATTORNEYS.

United States Patent Office 3,105,340
Patented Oct. 1, 1963

3,105,340
COTTON RECOVERING MACHINE
Roy F. Hewitt, Box 677, Hagerman, N. Mex.
Filed July 13, 1962, Ser. No. 209,683
8 Claims. (Cl. 56—48)

This invention relates to a novel machine for recovering cotton, from the ground and from adjacent rows of cotton plants, left after the transit of a cotton picker.

The primary object of the invention is the provision of an effective and efficient machine of the kind indicated, which is adapted to be constructed as an attachment for a cotton picker or as a complete machine having its own suction blower and traction means.

Another object of the invention is the provision of a machine of the character indicated above which has novel vertical cotton plant stripping rollers, a novel horizotal cotton pick-up roller assembly, a novel stalk breaking roller assembly, and a novel feed roller for feeding debris-stripped cotton to a suction conveyor, and novel belt means, driven from a power take-off pulley, for rotating the rollers in coordination.

Other important objects and advantageous features of the invention will be apparent from the following description and the accompanying drawings, wherein, for purposes of illustration only, a specific form of the invention is set forth in detail.

In the drawings:

FIGURE 4 is an enlarged vertical transverse section taken on the line 4—4 of FIGURE 3;

FIGURE 5 is an enlarged vertical longitudinal section taken on the line 5—5 of FIGURE 4, showing a toothed section removed;

FIGURE 6 is a face view of a toothed section;

FIGURE 7 is an enlarged fragmentary horizontal section taken on the line 7—7 of FIGURE 3; and FIGURE 8 is an enlarged fragementary horizontal section taken through the width adjusting means.

Figure 1:
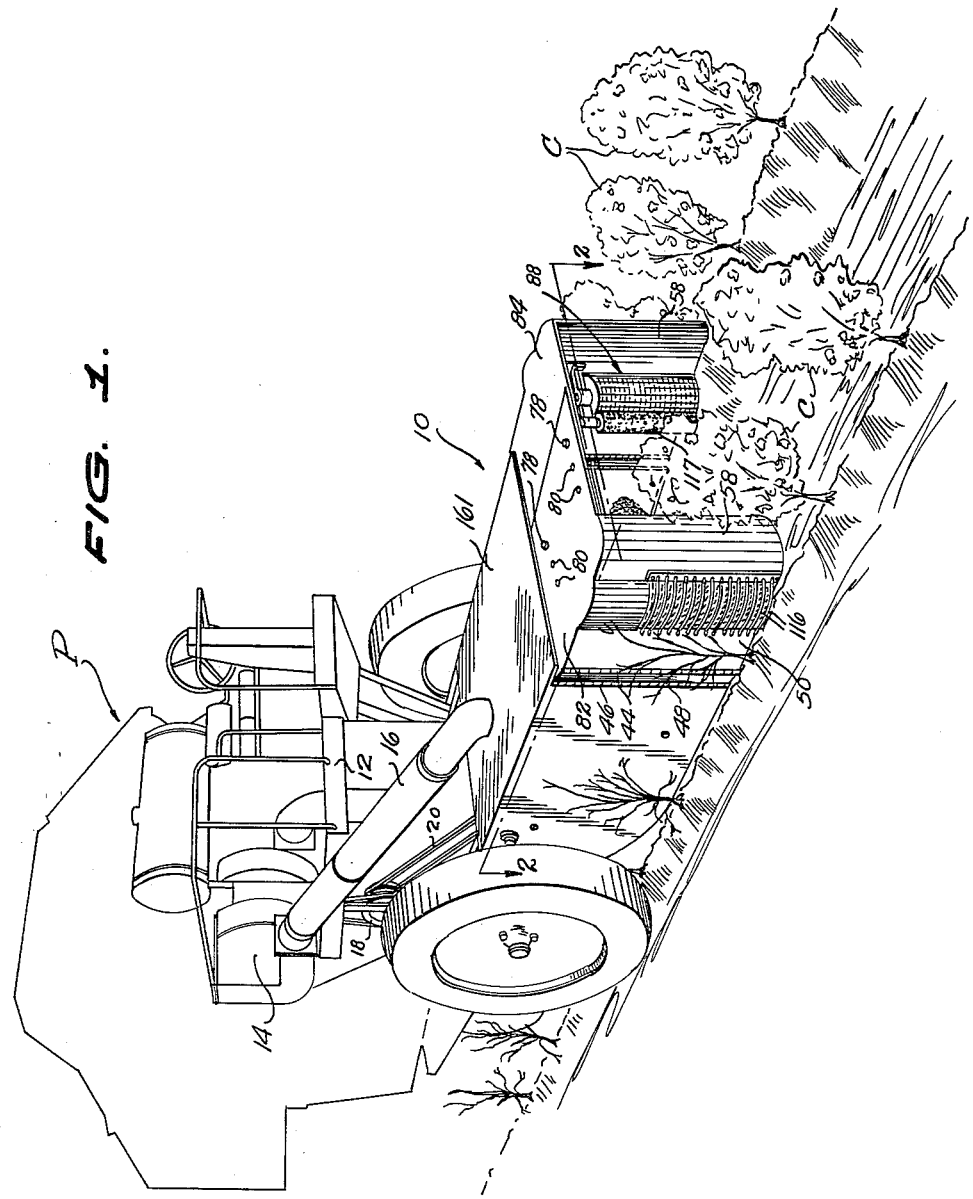
FIGURE 1 is a fragmentary schematic perspective view showing a machine of the present invention attached to a cotton picker and being operated between two adjacent rows of cotton plants.

Referring in detail to the drawings, wherein like numerals designate like parts throughout the several views, a machine generally designated 10, of the present invention, is shown attached to and operated by a conventional motor driven cotton picker P. The picker P has a forward frame member 12 upon which is mounted a suction blower 14 having a declining, forwardly extending pipe 16. A horizontal axis drive pulley 18 is supported below the frame member 12 over which is trained a forwardly extending drive belt 20. In accordance with the present invention, a pair of laterally spaced forwardly extending fixed horizontal arms 22 is present on the picker P, or provided and fixed thereto, as indicated at 24, in FIGURE 3, for attaching the machine 10 to the picker P. The arms 22 have journals 26, at their forward ends, through which a transverse driven shaft 28, of the machine 10, is journalled, and has a pulley 30 over which the drive belt 20 is trained. The picker P has pivoted thereon a forwardly extending hydraulic cylinder 32 (see FIGURE 3), spaced below the shaft 28 and the arms 22, which is pivoted, at its forward end, as indicated at 34, to a lower part of the machine 10, whereby the machine 10 is adapted to be canted, on the axis of the shaft 28, toward or away from the ground.

Figure 2:
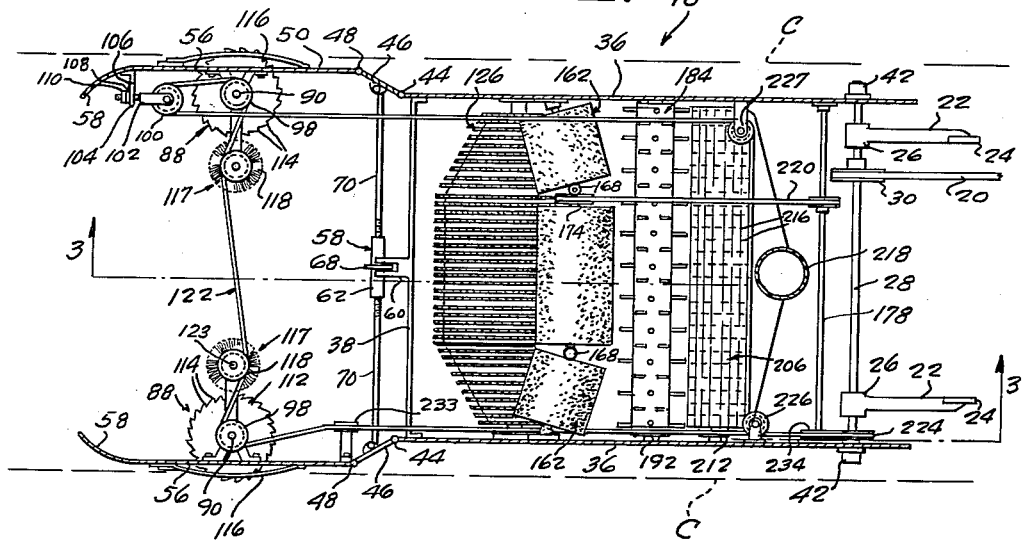
FIGURE 2 is a horizontal section taken on the line 2—2 of FIGURE 1.

The machine 10 comprises a pair of vertical, longitudinally elongated side plates 36, which are parallel spaced and connected together, by suitable means, such as a transverse cross member 38, fixed thereto, adjacent to their forward ends, and spaced above the horizontal lower edges 40 of the side plates. The driven shaft 28 is journalled through the side plates 36, in external bearings 42, thereon, at a location adjacent to the upper and rear edges of the side plates. Piano hinges 44 on the forward edges of the side plates 36 connect thereto, relatively narrow hinge plates 46, having piano hinges 48, on their forward edges, which connect thereto forwardly extending fender plates 50, of the same height as the side plates 36, and having lower edges 52, on a level with the lower edges of the side plates. The lower edges 52 have upturned forward end portions 54. As shown in FIGURE 2, the fender plates 50 have flat main portions 56 and laterally inwardly curved forward end portions 58.

The fender plates 50 are spaced parallel to each other, at a normal distance between adjacent rows C of cotton plants, but are adapted to be adjustably spaced, for contacting adjacent rows of plants disposed at lesser or greater distances from each other, by means of a width-adjusting assembly 58, which, as shown in FIGURES 2 and 8, comprises a centered clevis 60, fixed to and extending forwardly from the cross member 38, and having forwardly opening notches 62 in the arms 64, which accommodate a rotatable sleeve 66, having a centered annular adjusting wheel 68 fixed thereon, and retainably positioned between the clevis arms 64. The inner ends of transverse rods 70 are threaded into the ends of the sleeve 66, as indicated at 72, and their outer ends pivoted, as indicated at 74, to lugs 76, fixed to and extending inwardly from the hinge plates 46, so that when the wheel 68 is rotated in different directions, the fender plates 50 are moved toward and away from each other.

Adjustments of the fender plates 50, by means of the adjusting assembly 58, are retained by means of properly placing bolts 78, in holes 80, provide in the upper one of two overlapping horizontal cover plates 82 and 84, which are fixed to and extend inwardly from the upper edges of the fender plates 50.

The fender plates 50 are formed with rectangular, vertically elongated centered openings 86 through which vertical plant stripping rollers 88 operate. The rollers 88 have upstanding shafts 90 which are securably journalled through pairs of vertically spaced brackets 92 and 94, fixed, as indicated at 96, to the inner surfaces of the main portions 56 of the fender plates 50, above the openings 86. The shafts 90 have pulleys 98, above the brackets. An adjustable belt-tightener pulley 100, horizontally and longitudinally aligned with one of the pulleys 98, comprises a clevis 102 having a threaded stem 104 extending through a lateral bracket 106, fixed to the curved end portion 58 of a fender plate, with adjusting and locking nuts 108 and 110, respectively, threaded on the stem and bearing against the forward side of the bracket 106.

The stripping rollers 88 comprise vertical cylindrical drums 112 having closely vertically spaced rings of stripping saw-teeth 114 on their surfaces, which substantially fill the width of the openings 86. Pluralities of vertically spaced, outwardly and longitudinally bowed guard bars 116 are affixed to the exterior of the main portions 56 of the fender plates 50, extend around the outer sides of the rollers 88, and extend across the openings 86, to prevent cotton plants C from being drawn into and through the openings 86, and around the rollers 88.

Vertical cylindrical rotary brushes 117, preferably smaller in diameter than the rollers 88, and contacting the inner sides thereof, are carried by arms 118, fixed to and extending inwardly from and common to the brackets 92 and 94, the brushes 117 having upstanding shafts 123, having fixed pulleys 124 thereon, which are on a level with the pulleys 98 of the stripping rollers 88.

A cotton pick-up roller 126 extends between the side plates 36 adjacent to the forward ends thereto, and serves to pick up, from the ground, cotton stripped off adjacent rows of cotton plants C, by the stripping rollers 88 and brushed therefrom by the brushes 117. The pick-up roller 126 comprises a hollow drum having a plain cylindrical middle portion 128 and axially outwardly tapered frusto-conical end portions 130. As shown in FIGURE 4, the roller 126 has ends 131 having bearings 132, through which a shaft 134 extends, which is journalled, at its ends, in bearings 136, fixed on the side plates 36. A pulley 138 is fixedly circumposed on the shaft 134, between one end of the roller 126 and the adjacent side plate 36.

Figure 3:
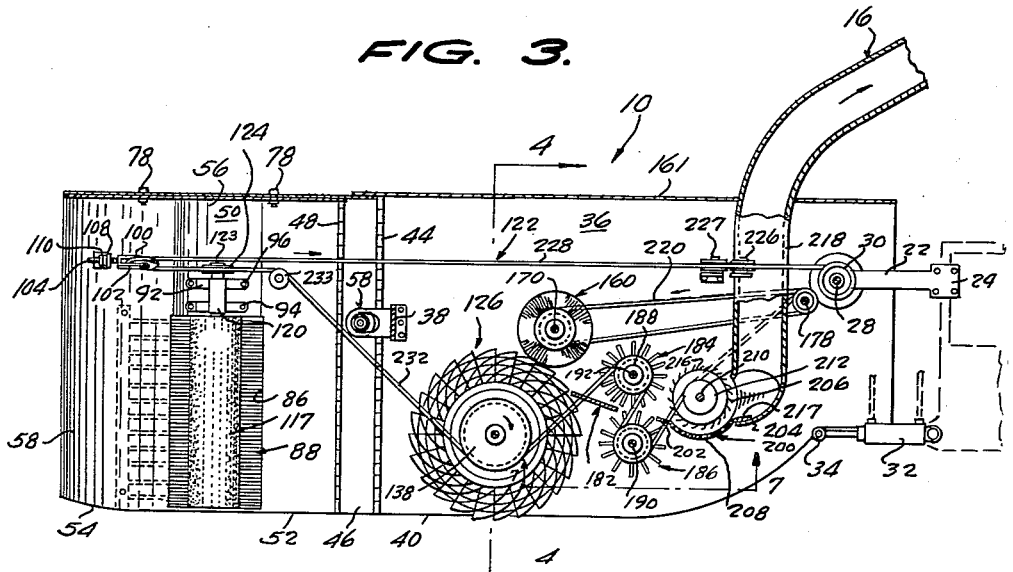
FIGURE 3 is a vertical longitudinal section taken on the line 3—3 of FIGURE 2.

As shown in FIGURES 4 through 6, the middle portion 128 of the roller 126 has fixedly circumposed thereon, at regularly longitudinally spaced intervals, toothed annular channels 140, composed of circumferential sections 142, secured in place, as by means of screws 144 threaded into the middle portion 128. Each section 142 comprises a web 146 and parallel spaced side walls 148, whose free edges are formed into saw teeth 150, having substantially radial leading edges 152 and acutely angled trailing edges 154. The frusto-conical end portions 130 of the roller 126 have secured therearound toothed annular channels 156, formed like and arranged like the channels 140, except that their webs 158 are canted to conform to the taper of the end portions 130. As shown in FIGURE 3, when rotated clockwise, the roller 126, which reaches below the lower edges of the side plates 36, picks up cotton from the ground and carries the cotton upwardly and then forwardly and downwardly against an overhead rotary brush assembly 160. A top wall 161 is fixed to the upper edges of the side plates and extend therebetween.

The overhead brush assembly 160 comprises, as shown in FIGURES 2 and 4, a pair of plain cylindrical end brushes 162, which are angled downwardly and outwardly to conform in angle to the taper of the frusto-conical end portions 130 of the pick-up roller 126. The end brushes 162 have shafts 164, which, at their outer ends, are securably journalled in socket bearings 166, fixed to the side plates 36. At their elevated inward ends, the shafts 164 are connected by universal joints 168 to related ends of the longitudinal transverse shaft 170 of a plain cylindrical middle brush 172. At one end, the shaft 170 has a pulley 174 fixed thereon, in line with a pulley 176, fixed on an auxiliary drive shaft 178, which is spaced forwardly from and below the driven shaft 28, and is journalled, at its ends, as indicated at 180, on the side plates 36.

A rearwardly, declining, imperforate transfer plate 182, spaced below the brush assembly 160, extends between the side plates 36, tangentially to the perimeter of the pick-up roller 126, extends between the roller 126 and the dividing line between a pair of upper and lower plant and twig breaking rollers 184 and 186, which have shafts 188 and 190, respectively, which extend between and are journalled on the side plates 36, and carry fixed pulleys 192 and 194, respectively. The rollers 184 and 186 are disposed in the same perpendicular plane, and comprise cylindrical drums 196 from which project rigid radial pins 198, which are arranged in staggered longitudinal rows, the pins of one drum being spacedly interdigitated with the pins of the other drum. The rollers 184 and 186 are rotated in opposite directions, in a rearward direction, so that stems and twigs of cotton plants or other debris, passing between these rollers, together with cotton deposited by the brush assembly 160 on and received from the transfer plate 182, are broken into smaller pieces, and together with cotton present, are deposited onto a fixed concave perforated sieve plate 200 which extends between the side plates 36. The sieve plate 200 has a rearwardly declining forward lip 202 which is tangential to the lower breaking roller 186, and a rearwardly inclined rear lip 204. A cleaning roller 206 is positioned concentrically above and is closely spaced from the concave portion 208 of the sieve plate 200 and has a shaft 210 which is journalled on the side plates, and carries a fixed pulley 212 on one end thereof, in line with the pulleys of the other rollers. The cleaning roller 206 comprises a cylindrical drum having distributed over its surface a plurality of evenly spaced rings of spikes or pins 216. The roller 206 rotates counterclockwise, as seen in FIGURE 3, so as to sweep cotton and pieces of twigs and stones rearwardly across the sieve plate, so that cotton is held out, while the pieces of stem and twig and any other debris, smaller than the perforations of the sieve plate 200, fall therethrough onto the ground.

The cleaning roller 206 and the sieve plate 200 deliver cleaned cotton to the forwardly fusing opening 217 of a vertical pendant part 218 of the picker suction pipe 16, whereby this cotton is driven through the pipe 16 to the hopper on the picker P.

Aside from the belt 220 which drives the overhead brush 160 from the auxiliary shaft 178, all of the other rollers and brushes are driven by a single belt 122 which is driven from a pulley 224 on the driven shaft 28. An idler pulley 226, mounted on the side plate 36 adjacent to the driven shaft pulley 24 has the upper flight 228 of the belt 122 trained therearound toward the other side plate, and around an idler pulley 227 thereon. The upper flight 228 extends forwardly from the idler pulley 227 and is trained around the belt tightener pulley 100, then rearwardly and inwardly around the adjacent stripper roller pulley 98, then around the forward side of the related brush roller pulley 118.

The upper belt flight 228 leads from the said brush pulley 118 around the rear side of the pulley 118, at the opposite side of the machine, hence the flight 228 is trained rearwardly around the forward side of the related stripper roller pulley 98 to the inner side of an idler pulley 233 on the rear of the related fender plate 50. The upper flight 228 then becomes the lower flight 232 of the belt 122, and is trained upwardly around the pulley 138 of the pick-up roller 126, over and downwardly around the pulley 192 of the upper breaking roller 184, then downwardly and rearwardly and upwardly around the forward side of the pulley 194 of the lower breaking roller 186, around the pulley 212 of the cleaning roller 206, and over the upper side of an idler pulley 234, journalled on the auxiliary shaft 178, to the pulley 224 on the driven shaft 28.

It will be seen from the foregoing that use of the described machine enables economically recovering, in a cleaned condition, from adjacent rows of cotton plants the cotton left thereon and not harvested by a conventional cotton picker, and cotton dropped by the picker onto the ground, which would otherwise be lost.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plates above and concentric with the sieve plate, a suction pipe having a forwardly facing opening at the rear edge of the sieve plate, and means for rotating the rollers, vertical rotary brushes supported on the fender plates at and engaged with the inner sides of the stripper rollers with which said rotating means is operatively connected, an overhead brush assembly extending between the side plates and engaged with the upper side of the pick-up roller between the pick-up roller and the upper breaking roller with which said rotating means is operatively connected, said rotating means comprising a driven shaft extending between the side plates at their rear ends adjacent to the upper edges thereof and having a drive pulley fixed thereon and adapted to be operatively connected to a power source, said drive pulley being located near one side plate, another pulley on the drive shaft adjacent to the other side plate, said pick-up roller, said breaking rollers, and said cleaning roller having pulleys adjacent to said other side plate, said stripping rollers and said vertical brushes having pulleys on their upper ends, an auxiliary shaft extending between the side plates and having pulleys thereon, said overhead brush assembly having a pulley, a first belt trained around the overhead brush assembly pulley and one of the auxiliary shaft pulleys, a second belt trained around the other pulley of the auxiliary shaft, said second belt being trained around the pulleys of the stripper rollers, vertical brushes, and the pulleys of the pick-up roller, the breaking rollers, and the cleaner roller and around the said other pulley on the driven shaft.

2. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plates above and concentric with the sieve plate, a suction pipe having a forwardly facing opening at the rear edge of the sieve plate, and means for rotating the rollers, vertical rotary brushes supported on the fender plates at and engaged with the inner sides of the stripper rollers with which said rotating means is operatively connected, an overhead brush assembly extending between the side plates and engaged with the upper side of the pick-up roller between the pick-up roller and the upper breaking roller with which said rotating means is operatively connected, said rotating means comprising a driven shaft extending between the side plates at their rear ends adjacent to the upper edges there of and having a drive pulley fixed thereon and adapted to be operatively connected to a power source, said drive pulley being located near one side plate, another pulley on the drive shaft adjacent to the other side plate, said pick-up roller, said breaking rollers, and said cleaning roller having pulleys adjacent to said other side plate, said stripping rollers and said vertical brushes having pulleys on their upper ends, an auxiliary shaft extending between the side plates and having pulleys thereon, said overhead brush assembly having a pulley, a first belt trained around the overhead brush assembly pulley and one of the auxiliary shaft pulleys, a second belt trained around the other pulley of the auxiliary shaft, said second belt being trained around the pulleys of the stripper rollers, vertical brushes, and the pulleys of the pick-up roller, the breaking rollers, and the cleaner roller and around the said other pulley on the driven shaft, in combination with a cotton picker supportably connected to the side plates, said picker having a drive pulley, a drive belt trained therearound and around the drive pulley on the driven shaft.

3. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plates above and concentric with the sieve plate, a suction pipe having a forward facing opening at the rear edge of the sieve plate, and means for rotating the rollers, vertical rotary brushes supported on the fender plates at and engaged with the inner sides of the stripper rollers with which said rotating means is operatively connected, an overhead brush assembly extending between the side plates and engaged with the upper side of the pick-up roller between the pick-up roller and the upper breaking roller with which said rotating means is operatively connected, said rotating means comprising a driven shaft extending between the side plates at their rear ends adjacent to the upper edges thereof and having a drive pulley fixed thereon and adapted to be operatively connected to a power source, said drive pulley being located near one side plate, another pulley on the drive shaft adjacent to the other side plate, said pick-up roller, said breaking rollers, and said cleaning roller having pulleys adjacent to said other side plate, said stripping rollers and said vertical brushes having pulleys on their upper ends, an auxiliary shaft extending between the side plates and having pulleys thereon, said overhead brush assembly having a pulley, a first belt trained around the overhead brush assembly pulley and one of the auxiliary shaft pulleys, a second belt trained around the other pulley of the auxiliary shaft, said second belt being trained around the pulleys of the stripper rollers, vertical brushes, and the pulleys of the pick-up roller, the breaking rollers, and the cleaner roller and around the said other pulley on the driven shaft, in combination with a cotton picker supportably connected to the side plates, said picker having a drive pulley, a drive belt trained therearound and around the drive pulley on the driven shaft, said picker having a suction blower having a pipe connected to said suction pipe.

4. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plates above and concentric with the sieve plate, a suction pipe having a forwardly facing opening at the rear edge of the sieve plate, and means for rotating the rollers, said pick-up roller having a plain cylindrical middle portion and outwardly tapering frusto-conical end portions, said overhead brush assembly comprising a plain cylindrical middle brush engaged with the middle portion of the pick-up roller, and plain cylindrical end brushes canted to engage the surfaces of the frusto-conical end portions of the pick-up rollers.

5. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearward declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plates above and concentric with the sieve plate, a suction pipe having a forwardly facing opening at the rear edge of the sieve plate, and means for rotating the rollers, said pick-up roller having a plain cylindrical middle portion and outwardly tapering frusto-conical end portions, said overhead brush assembly comprising a plain cylindrical middle brush engaged with the middle portion of the pick-up roller, and plain cylindrical end brushes canted to engage the surfaces of the frusto-conical end portions of the pick-up rollers, said end brushes having shafts journalled at their outer ends on the side plates and having universal joints on their inner ends, said middle brush having a shaft connected at its ends to the universal joints.

6. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plate above and concentric with the sieve plate, a suction pipe having a forwardly facing opening at the rear edge of the sieve plate, and means for rotating the rollers, said pick-up roller having a plain cylindrical middle portion and outwardly tapering frusto-conical end portions, said overhead brush assembly comprising a plain cylindrical middle brush engaged with the middle portion of the pick-up roller, and plain cylindrical end brushes canted to engage the surfaces of the frusto-conical end portions of the pick-up rollers, said pick-up roller portions having channel rings circumposed thereon at regular spaced intervals, said rings having webs secured to the surfaces of the roller portions and side walls formed with teeth having radial leading edges and acutely angled trailing edges.

7. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plate above and concentric with the sieve plate, a suction pipe having a forwardly facing opening at the rear edge of the sieve plate, and means for rotating the rollers, said pick-up roller having a plain cylindrical middle portion and outwardly tapering frusto-conical end portions, said overhead brush assembly comprising a plain cylindrical middle brush engaged with the middle portion of the pick-up roller, and plain cylindrical end brushes canted to engage the surfaces of the frusto-conical end portions of the pick-up rollers, said pick-up roller portions having channel rings circumposed thereon at regular spaced intervals, said rings having webs secured to the surfaces of the roller portions and side walls formed with teeth having radial leading edges and acutely angled trailing edges, said rings comprising removable arcuate sections.

8. A cotton recovering machine comprising a pair of laterally spaced vertical longitudinal side plates having forward and rear ends, fender plates mounted on and extending forwardly from the side plates at the forward ends thereof, said fender plates having openings, vertical cotton plant stripper rollers mounted on the fender plates and extending outwardly through said openings, a pick-up roller extending between the side plates at lower forward locations thereon and reaching below the side plates, a rearwardly declining transfer plate positioned tangentially to the rear side of the pick-up roller, upper and lower stem breaking rollers extending between the side plates rearwardly of the pick-up roller, said transfer plate having its depressed rear edge at the meeting point of the breaking rollers, a concave sieve plate extending between the side plates rearwardly of the lower breaker roller, said sieve plate having a forward edge arranged tangentially to the lower breaker roller, a cleaner roller extending between the side plates above and concentric with the sieve plate, a suction pipe having a forwardly facing opening at the rear edge of the sieve plate, and means for rotating the rollers, vertical rotary brushes supported on the fender plates at and engaged with the inner sides of the stripper rollers with which said rotating means is operatively connected, an overhead brush assembly extending between the side plates and engaged with the upper side of the pick-up roller between the pick-up roller and the upper breaking roller with which said rotating means is operatively connected, said rotating means comprising a driven shaft extending between the side plates at their rear ends adjacent to the upper edges thereof and having a drive pulley fixed thereon and adapted to be operatively connected to a power source, said drive pulley being located near one side plate, another pulley on the drive shaft adjacent to the other side plate, said pick-up roller, said breaking rollers, and said cleaning roller having pulleys adjacent to said other side plate, said stripping rollers and said vertical brushes having pulleys on their upper ends, an auxiliary shaft extending between the side plates and having pulleys thereon, said overhead brush assembly having a pulley, a first belt trained around the overhead brush assembly pulley and one of the auxiliary shaft pulleys, a second belt trained around the other pulley of the auxiliary shaft, said second belt being trained around the pulleys of the stripper rollers, vertical brushes, and the pulleys of the pick-up roller, the breaking rollers, and the cleaner roller and around the said other pulley on the driven shaft, in combination with a cotton picker supportably connected to the side plates, said picker having a drive pulley, a drive belt trained therearound and around the drive pulley on the driven shaft, said picker having a suction blower having a pipe connected to said suction pipe, said driven shaft having rearwardly extending arms journalled thereon and fixed to the cotton picker, and a hydraulic cyclinder extending between and pivoted to a lower rear part of a side plate and to picker, for tilting the machine relative to the ground, on the axis of the drive shaft.

References Cited in the file of this patent
UNITED STATES PATENTS

| | | |
|---|---|---|
| 1,836,128 | Palmer | Dec. 15, 1931 |
| 1,842,737 | Tharp | Jan. 26, 1932 |
| 1,879,823 | Ray | Sept. 27, 1932 |
| 2,663,136 | Toole | Dec. 22, 1953 |